US010584635B2

(12) United States Patent
Armstrong et al.

(10) Patent No.: US 10,584,635 B2
(45) Date of Patent: Mar. 10, 2020

(54) ALL CO2 AIRCRAFT

(71) Applicants: Rolls-Royce North American Technologies, Inc., Indianapolis, IN (US); Rolls-Royce Corporation, Indianapolis, IN (US)

(72) Inventors: Michael J. Armstrong, Avon, IN (US); Igor Vaisman, Carmel, IN (US)

(73) Assignees: Rolls-Royce North American Technologies, Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 481 days.

(21) Appl. No.: 15/289,267

(22) Filed: Oct. 10, 2016

(65) Prior Publication Data

US 2017/0101931 A1  Apr. 13, 2017

Related U.S. Application Data

(60) Provisional application No. 62/239,091, filed on Oct. 8, 2015.

(51) Int. Cl.
*F02C 6/18* (2006.01)
*F01K 25/10* (2006.01)
(Continued)

(52) U.S. Cl.
CPC ............... *F02C 6/18* (2013.01); *B64D 27/10* (2013.01); *B64D 41/00* (2013.01); *F01K 23/10* (2013.01);
(Continued)

(58) Field of Classification Search
CPC ........ F01K 25/103; F01K 25/10; F01K 23/10; F02C 3/13; F02C 6/18; F02C 6/08; F02C 7/141; F02C 7/10; F02C 7/08
See application file for complete search history.

(56) References Cited

U.S. PATENT DOCUMENTS 6,269,624 B1 * 8/2001 Frutschi ................ F01K 21/047
60/783
7,377,111 B2 * 5/2008 Agnew ..................... F02C 3/34
60/752

(Continued)

FOREIGN PATENT DOCUMENTS

EP    3109433 A1   12/2016
EP    3147219 A1   3/2017

OTHER PUBLICATIONS

European Search Report E56820092/RR dated Feb. 22, 2017.
European Office Action dated Apr. 15, 2019 for European Patent Application No. 16191518.6.

*Primary Examiner* — Steven M Sutherland
*Assistant Examiner* — Thuyhang N Nguyen
(74) *Attorney, Agent, or Firm* — Fishman Stewart PLLC

(57) ABSTRACT

An aircraft power and propulsion system includes an air compressor, a heat rejection heat exchanger, a combustor positioned to receive compressed air from the air compressor as a core stream and provide thrust to the aircraft, and a closed-loop s-$CO_2$ system. The closed-loop s-$CO_2$ system includes carbon dioxide as a working fluid, receives power from the combustor, and rejects heat via the heat rejection heat exchanger to a cooling stream. The closed-loop system s-$CO_2$ configured to provide power to a fan that provides the cooling stream and thrust, and power to the air compressor and at least one auxiliary load.

19 Claims, 4 Drawing Sheets

(51) Int. Cl.
    *F01K 23/10*    (2006.01)
    *B64D 27/10*    (2006.01)
    *B64D 41/00*    (2006.01)
    *F02C 3/04*     (2006.01)
    *F02C 7/18*     (2006.01)
    *F02K 3/06*     (2006.01)

(52) U.S. Cl.
    CPC .............. *F01K 25/103* (2013.01); *F02C 3/04* (2013.01); *F02C 7/185* (2013.01); *F02K 3/06* (2013.01)

(56) References Cited

U.S. PATENT DOCUMENTS

| | | |
|---|---|---|
| 8,959,887 B2 | 2/2015 | Allam et al. |
| 8,966,901 B2 | 3/2015 | Held et al. |
| 9,014,791 B2 | 4/2015 | Held |
| 9,032,734 B2 | 5/2015 | Davidson et al. |
| 9,033,283 B1 | 5/2015 | Hemmelgarn et al. |
| 2012/0186219 A1 | 7/2012 | Gurin |
| 2013/0180259 A1 | 7/2013 | Stapp |
| 2014/0260340 A1* | 9/2014 | Vaisman ................ B64D 13/08 62/56 |
| 2014/0352317 A1 | 12/2014 | Loebig et al. |
| 2015/0275758 A1* | 10/2015 | Foutch .................... F02C 7/047 60/779 |

\* cited by examiner

ALL CO2 AIRCRAFT

CROSS-REFERENCE TO RELATED APPLICATIONS

This application is a non-provisional application claiming priority to U.S. Provisional Application No. 62/239,091 filed Oct. 8, 2015, which is hereby incorporated by reference in its entirety.

FIELD OF TECHNOLOGY

An improved apparatus and method of operating a power and propulsion system includes providing power to distributed propulsors using carbon dioxide ($CO_2$) operated in super-critical cycle.

BACKGROUND

It has become increasingly desirable to increase the efficiency and reduce the size of power-producing or thrust-producing devices such as gas turbine engines in aircraft. Gas turbine engines typically include one or more shafts that include compressors, bypass fans, and turbines. Typically, air is forced into the engine and passed into a compressor. The compressed air is passed to a combustor, and at high temperature and pressure the combustion products are passed into a turbine. The turbine provides power to the shaft, which in turn provides the power to the compressor and bypass fan or gearbox. Thrust is thereby produced from the air that passes from the bypass fan, as well as from the thrust expended in the turbine combustion products. This system is typically packaged together with power production and thrust generation co-located.

However, air can be thermodynamically inefficient, especially during high altitude operation of the engine (such as in an aircraft application). Air that enters the engine is of low pressure, therefore low density. In order to reach the needed pressure and temperature at the combustor exit, the air is compressed to very high pressure ratios and heated up to very high temperatures in the combustors. In order to provide adequate mass flow rate, significant volume flow rate of the low density air is pumped through high pressure ratio consuming significant amount of power. As a result the engines are made of large and heavy components, consume large amount to fuel, and may include significant operational and maintenance expenses to cope with high combustion temperatures.

To increase system efficiency and reduce component size and complexity of turbomachinery, some power-producing or thrust-producing use a closed cycle super-critical carbon dioxide (s-$CO_2$) system. This system provides significantly improved efficiencies compared to Brayton and other air-based systems by operating in a super-critical region (operating at a temperature and pressure that exceed the critical point). That is, a phase-diagram of $CO_2$, as is commonly known, includes a "triple point" as the point that defines the temperature and pressure where solid, liquid, and vapor meet. The critical point is the top of the dome made up of the saturated liquid and saturated vapor lines. Above the critical point is the gaseous region. At the triple point the fluid can exist in liquid, vapor, or in a mixture of the both states. However, at higher temperature and pressure, a critical point is reached which defines a temperature and pressure where gas, liquid, and a super-critical region occur.

Fluids have a triple point, a critical point, saturated liquid and vapor lines, and a super-critical region. One in particular, carbon dioxide, is particularly attractive for such operation due to its critical temperature and pressure of approximately 31° C. and 73 atmospheres, respectively, as well as due to its lack of toxicity. Thus, s-$CO_2$—based systems may be operated having very dense super-critical properties, such as approximately 460 kg/m$^3$. The excellent combination of the thermodynamic properties of carbon dioxide may result in improved overall thermodynamic efficiency and therefore a tremendously reduced system size. Due to the compact nature and high power density of a power source that is powered with a super-critical cycle, the overall size of the engine may be significantly reduced, as well.

Aircraft typically include auxiliary loads that are powered by electrical, hydraulic, and pneumatic sub-systems that provide power to mechanical loads, actuators, and the like. The electrical sub-systems may be powered by electrical generators, which are thermodynamically inefficient because of the conversion from heat (typically of the gas turbine engine), to electrical power, and then provided to the auxiliary loads. Further inefficiencies may result from storage of the electrical energy as chemical energy as in a battery, as an example. In addition, in an aircraft application additional overall system inefficiencies occur because of the mass of equipment that is typically used (electrical generator, batteries, etc.) to convert and store the energy for auxiliary operation. Similar conversion, distribution, and storage inefficiencies are present for hydraulic and pneumatic distribution systems as well.

As such, it is desirable to reduce overall mass and improve system efficiency when employing a s-$CO_2$ system.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An exemplary power and propulsion is described herein, and various embodiments thereof. According to the disclosure, a power and propulsion uses a power source to provide power to the shaft, while providing adequate power and thrust for aircraft and other purposes.

Various applications include, as examples, a turbojet, a turbofan, adaptable, turboprop and turboshaft engine configurations. The turbojet derives most of its thrust from a core stream and is generally most advantageous in high altitude and/or high mach regimes. Turbojets bypass minimal airflow around the core so they tend to be a smaller diameter, are less noisy, and have a lower drag efficient. The turbofan, on the other hand, derives most of its thrust from the bypass stream which offers advantages in fuel savings mostly in subsonic applications. Turbofans bypass a high amount of airflow around the core and appear larger in diameter. Because of the larger fan turning more slowly they produce less noise than a turbojet.

Turboprop engines characteristically attach a turbine engine to drive a propeller instead of a fan. Because propellers typically turn more slowly because of their larger diameter, a gearbox may be provided between the turbine engine and the propeller. In a turboshaft application, the turbine connects to something other than a fan or propeller, often a helicopter rotor or shaft in a marine application. Turboshafts typically include a gearbox between the turbine engine and rotor or shaft.

Figure 1:
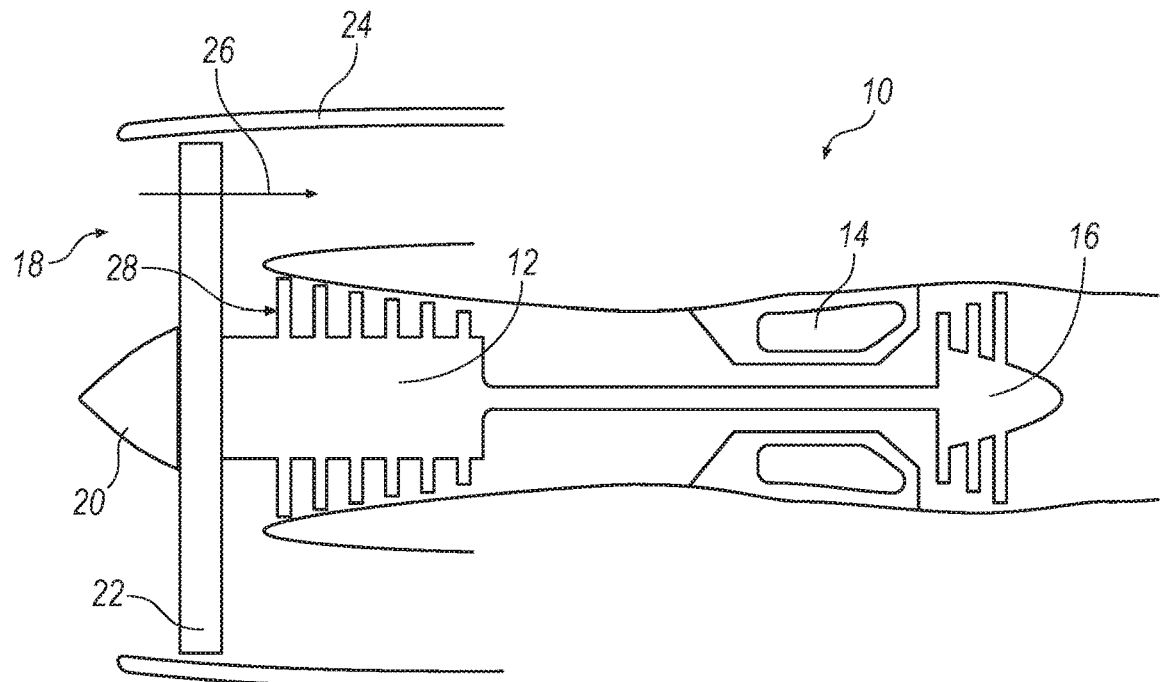
FIG. 1 is an illustration of a conventional power and propulsion.

FIG. 1 illustrates an exemplary schematic diagram of a gas turbine machine 10 that is a primary mover or thrust source for an aircraft. The turbine machine 10 includes a primary compressor 12, a combustor 14 and a primary turbine assembly 16. A fan 18 includes a nosecone assembly 20, blade members 22 and a fan casing 24. The blade members 22 direct low pressure air to a bypass flow path 26 and to the compressor intake 28, which in turn provides airflow to compressor 12. The engine provides two major functions: propulsion and power generation used to rotate the compressors, turbines, and the bypass fan. The major function, propulsion, includes fairly low air pressures and temperatures, which are approximately equal to the pressures and temperatures exiting the power and propulsion. However, the air pressure ratios and temperatures generated in the power and propulsion are relatively very high. The high pressure ratios and temperatures are needed to provide the power generation function.

A closed-loop system in this regard refers to a power-producing circuit that includes its own working fluid, such as a s-$CO_2$ system, and which operates in compression, expansion, and heat rejection in a closed-loop analogous to a closed-loop refrigeration system. That is, aside from incidental leakage of the working fluid, the working fluid does not otherwise contact the external environment during operation.

Thus, in general, a power-producing device includes an inner housing for passing a core stream of air, the inner housing houses a first shaft coupled to a first turbine and a first compressor, a second shaft coupled to a second turbine and a second compressor, a third shaft coupled to a third turbine and a fan assembly, a combustor positioned to receive compressed air from the second compressor, and a heat rejection heat exchanger configured to reject heat from a closed-loop system. The closed-loop system includes the first, second, and third turbines and the first compressor and receives energy input from the combustor.

Figure 2:
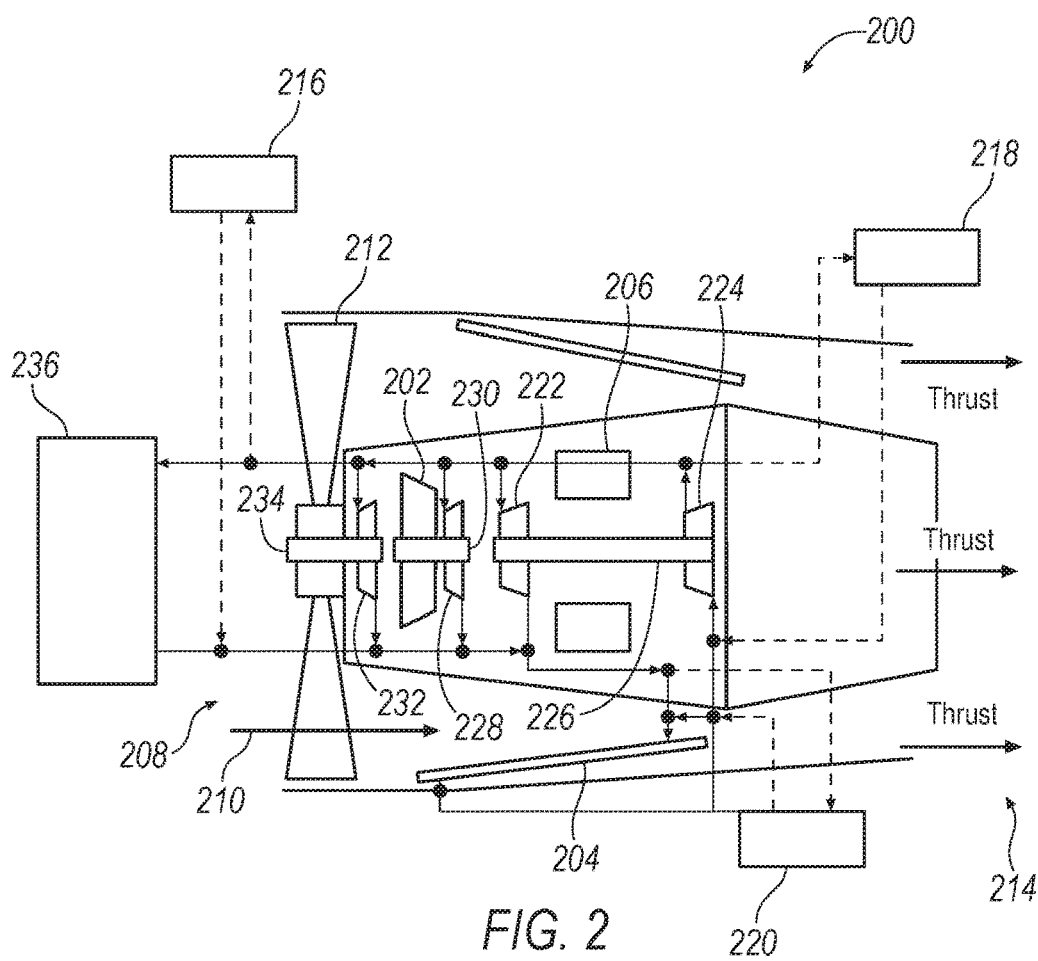
FIG. 2 is an illustration of a power-producing device for an aircraft gas turbine system for thrust and for powering auxiliary devices.

FIG. 2 shows a power-producing device for an aircraft or an aircraft power and propulsion system 200 that may be employed in an aircraft application for providing thrust and power to auxiliary devices, according to one example. System 200 includes an air compressor 202 that is a low pressure (LP) compressor for compressing air prior to combustion within system 200. System 200 includes a heat rejection heat exchanger 204, and a combustor 206 positioned to receive compressed air from air compressor 202 as a core stream, and provide thrust to the aircraft.

A closed-loop s-$CO_2$ system 208 having carbon dioxide as a working fluid, receives thermal power from combustor 206 via $CO_2$ channels integrated with the combustor and rejects heat via heat rejection heat exchanger 204 to a cooling stream 210. Closed-loop system 208 further includes a first s-$CO_2$ turbine 222 coupled to an s-$CO_2$ compressor 224 via a first shaft 226, a second s-$CO_2$ turbine 228 coupled to air compressor 202 via a second shaft 230, and a third s-$CO_2$ turbine 232 coupled to fan 212 via a third shaft 234. Closed-loop system 208 also includes a primary propulsive load 236 that provides primary propulsion, such as via a turboprop, for system 200.

Closed-loop s-$CO_2$ system 208 is configured to provide power to a fan 212 that provides cooling stream 210 and thrust 214. Closed-loop s-$CO_2$ system 208 also provides power to air compressor 202, and at least one auxiliary power loads 216, auxiliary actuation loads 218 (such as engine utility, flight control, ECS), and auxiliary heating loads 220 (such as, ice protection, ECS). The auxiliary power load may provide mechanical power for pumps, generators, pressure control system of ECS, compressors of conventional or trans-critical vapor cycle cooling systems as parts of ECS, or other rotating devices. Also, it may provide electrical power.

Figure 3:
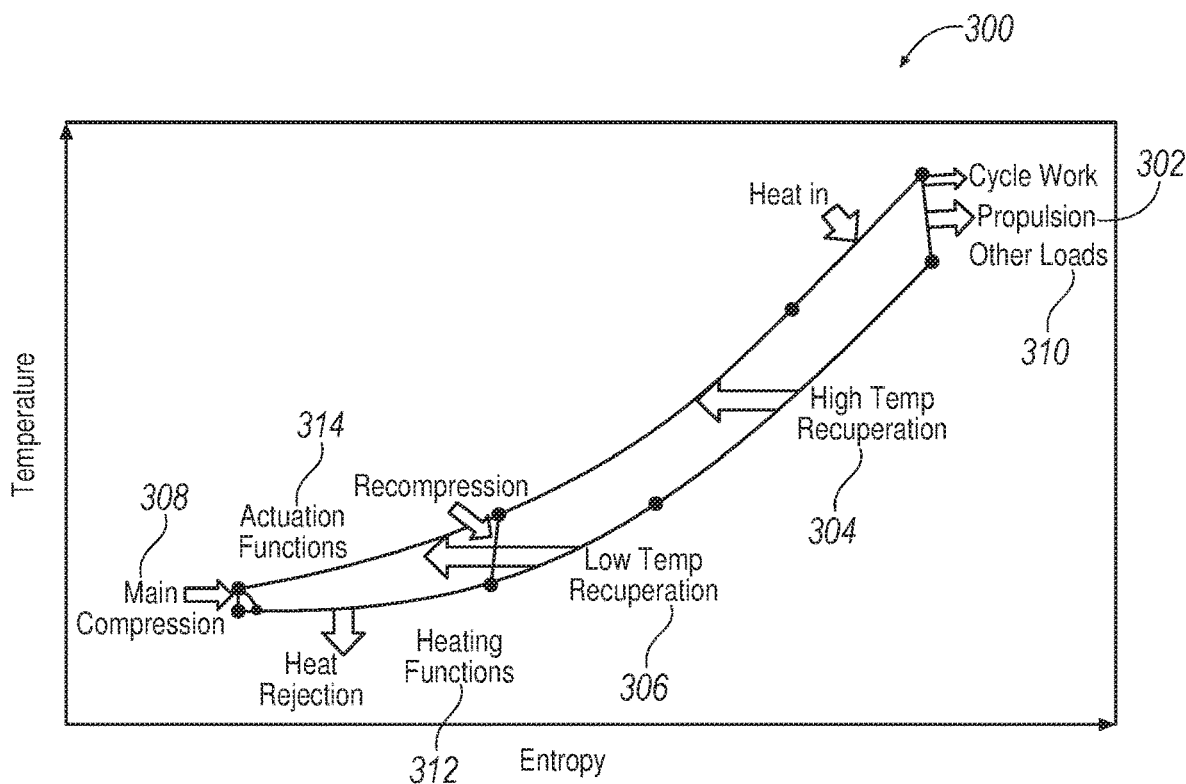
FIG. 3 illustrates an entropy diagram for illustration of operation of a closed-loop s-$CO_2$ system.

FIG. 3 illustrates an entropy diagram 300 for illustration of operation of the working fluid within closed-loop s-$CO_2$ system 208. As is commonly known, temperature-entropy (TS) diagram 300 generally represents a thermodynamic Brayton cycle, albeit in supercritical (s-$CO_2$) operation. TS diagram 300 illustrates various stages of operation, to include propulsion 302, high and low temperature recuperation 304, 306, and main compression 308, as examples. TS diagram 300 also includes locations 310, 312, 314 that are representatives of auxiliary loads, at which point different grades of energy are available for operation thereof. For instance, a relatively high grade of energy is available and designates as other loads 310, which corresponds with auxiliary power loads 216 of system 200, and with working fluid having exited from combustor 206. In another example, a relatively low grade of energy occurs for heating functions 312, which corresponds with auxiliary heating loads 220 of system 200, and with working fluid just prior to heat rejection in heat rejection heat exchanger 204. In yet another example, a different grade of energy occurs for actuation functions 314, which corresponds with auxiliary actuation loads 218 of system 200, and with working fluid extracted at the exit of s-$CO_2$ compressor 224. In these examples the energy may be conveniently piped to a location where it can be efficiently used, as the working fluid provides a convenient vehicle for the efficient movement of energy.

Thus, points in the cycle from which the designated auxiliary aircraft functions receive their support are selected to maximize efficiency and reduce the need for long distance, high temperature s-$CO_2$ distribution. FIG. 3 illustrates the point on a recuperated s-$CO_2$ cycle with recompression where these functions would be performed.

While heat may be provided at many points in the s-$CO_2$ cycle, it is desirable for heating functions to be performed prior to or in parallel with the heat rejection portion of the cycle. This is done to reduce the amount of wasted heat during portions of the mission when ice protection of ECS heating functions may be desired. s-$CO_2$ is routed along the leading edges of the wing, and to inlets and nacelles, probes, or all other locations where ice protection or ECS heating functions would be desired. Additionally, s-$CO_2$ is routed to the ECS system to provide heating to cabin air.

Actuation functions take advantage of the already pressurized fluid provided by the closed s-$CO_2$ cycle. FIG. 3 illustrates a portion of the fluid directly following or during main compression being used for actuation functions. Due to the extensive distribution systems used for flight control and utility actuation, it is preferable to distribute low temperature s-$CO_2$ throughout the aircraft. Flight control actuation will be performed using piston cylinder actuators configured to operate using s-$CO_2$. Low pressure return lines provide s-$CO_2$ back to the main compressor inlet. An alternative means for this actuation function support would be to provide a dedicated s-$CO_2$ compressor for this function.

Additional mechanical shaft power may be provided at the main power extraction point in the cycle to maximize cycle efficiency. Distributed s-$CO_2$ lines and expansion may be used at other points in the cycle to support diverse aircraft functions. This retains benefits of uniform power distribution and the elimination of conversion losses.

Closed-loop s-$CO_2$ system 208 provides power via the working fluid to at least one auxiliary load 216, 218, 220 by being configured to provide a first grade of energy 310, 312, 314 to a first aircraft function 216, 220, 218, and a second grade of energy 310, 312, 314 to provide a second aircraft function 216, 220, 218. As seen in diagram 300, the first and second grades of energy 310, 312, 314 are extracted at different entropy levels and at different stages within closed-loop s-$CO_2$ system 208. Thus, the first and second grades of energy are extracted as one of output from s-$CO_2$ compressor 224, output from combustor 206, and output from first s-$CO_2$ turbine 222 and prior to entering heat rejection heat exchanger 204. In one example, the auxiliary load includes a heating function, in element 220 of system 200, which can provide a low-grade heat for purposes such as ice protection and an environmental control system (ECS), as examples. In another example, the auxiliary load includes an actuation function, in element 218 of system 200, for actuation of items within in aircraft such as engine operation, utility operation, and flight control, as examples. In the example of element 218, in one example the actuator(s) may be driven by a pressure drop of the working fluid to cause operation of a hydraulic ram. In yet another example, a mechanical load may be operated, such as an ECS, or pumps or generators, as example. ECS may include a compressor for air pressure control in cabins, a compressor of a conventional vapor cycle cooling system, or a compressor of trans-critical $CO_2$ vapor cycle cooling system.

Accordingly, system thermodynamic improvements are realized because the auxiliary loads 216, 218, 220 are run directly from the working fluid of closed-loop s-$CO_2$ system 208. That is, thermodynamic efficiency is improved and mass on an aircraft is reduced, as the direct conversion to useful auxiliary power, low-grade heat, etc . . . avoids what otherwise may be two-step energy conversion, and the corresponding equipment needed for such conversion.

Figure 4:
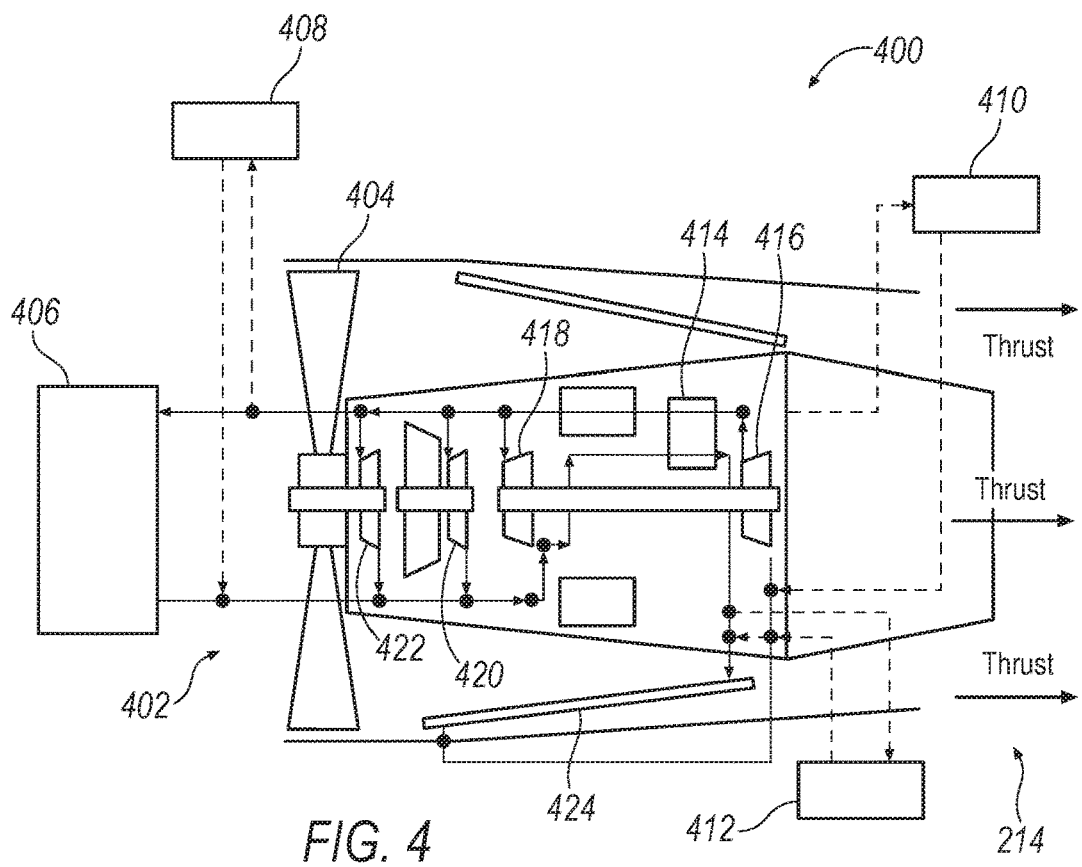
FIG. 4 is an illustration of a power-producing device for an aircraft gas turbine system having a recuperative heat exchanger.

Referring to FIG. 4, an aircraft power and propulsion system 400 that may be employed in an aircraft application, in a similar fashion to the illustration of system 200 of FIG. 2. System 400 includes a closed-loop s-$CO_2$ system 402 in which a working fluid provides power to a fan 404 and a primary propulsive load 406, as examples. Thus, as with system 200, auxiliary loads 408, 410, and 412 may be powered by the working fluid (carbon dioxide) of closed-loop recuperation s-$CO_2$ system 402. However, system 400 includes a recuperative heat exchanger 414 or recuperator that is positioned to exchange heat from the working fluid that exits s-$CO_2$ compressor 416 to the working fluid that exits one of first, second, and third s-$CO_2$ turbines 418, 420, 422. As such, thermodynamic efficiency of closed-loop s-$CO_2$ system 402 is improved, as heat from the working fluid that exits compressor 416 is extracted to the working fluid before entering heat rejection heat exchanger 424.

Figure 5:
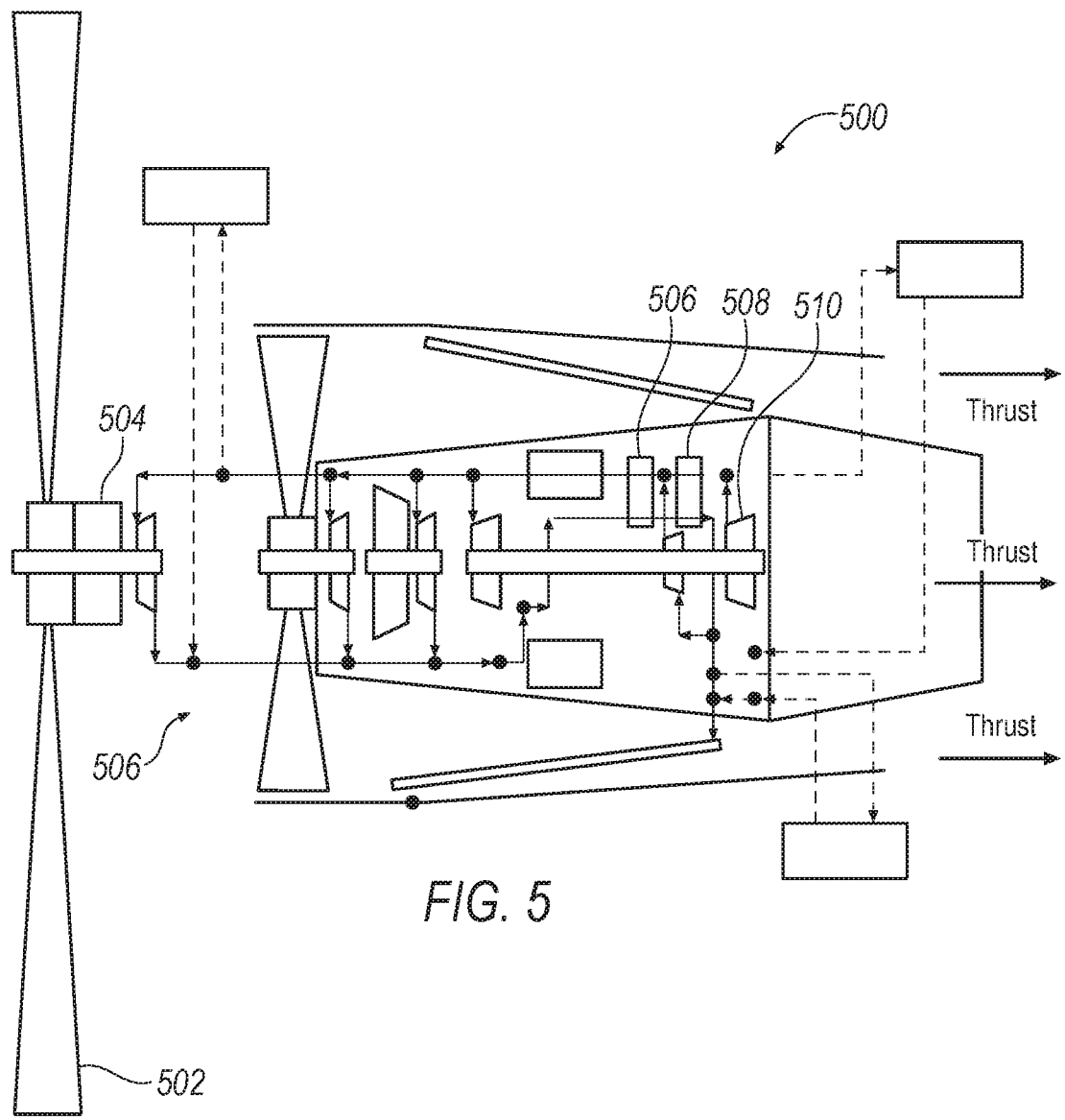
FIG. 5 is an illustration of a power-producing device for an aircraft gas turbine system having a recuperative heat exchanger and recompression.

Referring to FIG. 5, a system 500 is illustrated having the basic functionality of the example of system 200. However, system 500 in this example includes, instead of a "primary propulsive load" as described as element 236 of FIG. 2, or element 406 of FIG. 4, a propeller or fan 502 is shown as the primary propulsive load, which can provide thrust to system 500. In the example shown, the primary propulsive load may include a gear box 504 that may properly step down a shaft rotational speed during the operation of a s-$CO_2$ turbine off of the working fluid of closed-loop recompression s-$CO_2$ system 506. This example also includes both a low temperature recuperator 512 and a high temperature recuperator 508, as well as a recompression compressor 510 that can add yet further thermodynamic efficiency to the overall process of closed-loop s-$CO_2$ system 506. Thus, when recompression occurs in recompression compressor 510, the recompression results in heating of the working fluid, which is then cooled before passing through high temperature recuperator 508, providing improved thermodynamic efficiency.

FIG. 5 and its description includes a recuperated s-$CO_2$ cycle with recompression driving a fan or propeller. However, this approach to an "all $CO_2$" aircraft can be implemented with any variety of s-$CO_2$ cycle and any variety of primary propulsive force (prop, fan, rotor, distributed propulsion system, etc.). The vehicle functions remain in the same general arrangement with the cycle (actuation with main compression, heating associated with heat rejection, trans-critical $CO_2$ vapor cycle cooling systems, and other loads with main expansion).

Figure 6:
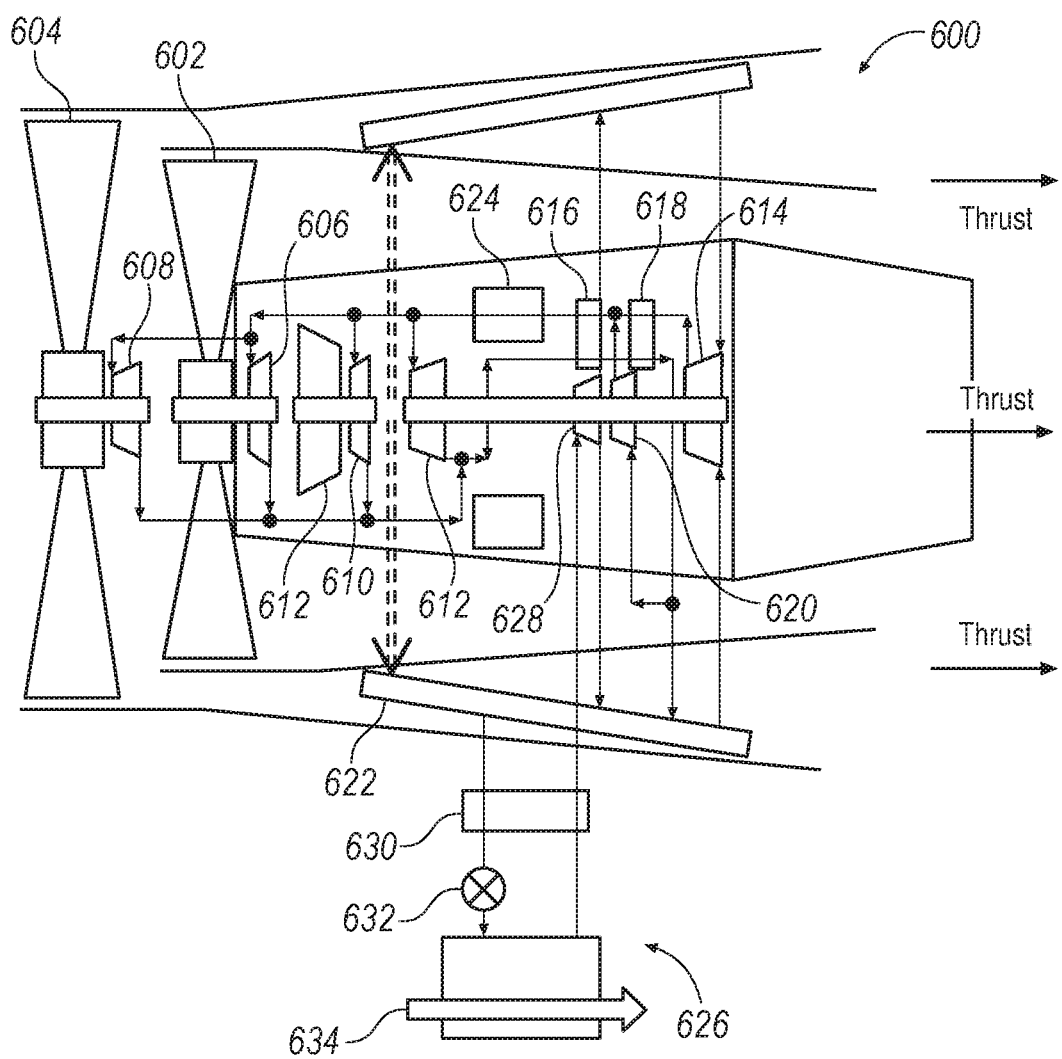
FIG. 6 illustrates a s-$CO_2$—based device having also a vapor cycle system (VCS).

FIG. 6 is an example of a cooling system integrated with power and propulsion as an example of integrated thermal and power system. One exemplary embodiment is as is illustrated 600, in which a super-critical operation or s-$CO_2$ system may be operated to provide thrust via propulsors 602, 604. In this system a working fluid such as $CO_2$ operates via turbines 606, 608 to power propulsors 602, 604. Turbine 610 also operates an air or low pressure (LP) compressor 612. Another s-$CO_2$ turbine 636 provides power to a corresponding s-$CO_2$ compressor 614. In the example illustrated, the working fluid also passes through a low temperature recuperator 616 and a high temperature recuperator 618, with a recompression s-$CO_2$ compressor 620 positioned therebetween. System 600 includes a heat rejection heat exchanger 622 that rejects heat from the working fluid, which drives compressor 614, compressor 612, and propulsors 602, 604. Power input to the system is via combustor 624. As mentioned, recompression may occur in the optional recompression s-$CO_2$ compressor 620, providing improved thermodynamic efficiency with its operation, as well as that of recuperators 616, 618.

System 600 also includes a vapor cycle system 626 (VCS) that shares its heat rejection with that of the working fluid system. That is, VCS 626 operates as a conventional vapor cycle system having a VCS compressor 628, a VCS heat absorption exchanger 630, and an expansion device 632. Thus, in operation, VCS system 626 may cool an additional or auxiliary heat load 634 via a conventional vapor cycle system that shares its heat rejection in heat rejection heat exchanger 622 with that of the working fluid. In one embodiment there may be an integrated heat rejection unit (vapor cycle system or "VCS" compressor and heat rejection exchanger only).

Thus, FIG. 6 illustrates a s-$CO_2$—based device that includes a trans-critical $CO_2$ cycle. In this example, fan 604 provides cooling to heat rejection heat exchanger 622, which passes the working fluid through both a trans-critical $CO_2$ circuit. It is contemplated, however, that other combinations of examples may be used in the disclosed system. The power producing circuit thereby provides power to air compressor 612, compressors 620 and 614, propulsors 602, 604, and at least one of auxiliary power load, and to compressor 628 to provide cooling (such as engine utility, flight control, ECS, ice protection, ECS, mechanical power for pumps, generators, pressure control system of ECS, compressors of conventional or trans-critical vapor cycle cooling systems as parts of ECS, or other rotating devices).

Accordingly, a method of providing power via an aircraft power and propulsion includes receiving compressed air from an air compressor as a core stream to provide thrust to an aircraft, providing power in a closed-loop s-$CO_2$ system, and having carbon dioxide as a working fluid. The working fluid powers a fan that provides a cooling stream and thrust to the aircraft, the air compressor, and at least one auxiliary load. The method includes rejecting heat from the closed-loop s-$CO_2$ system via a heat rejection heat exchanger to the cooling stream.

Integrating the support of these functions (auxiliary power systems) into the primary propulsion cycle has many advantages. Distributing power via the same medium as the closed cycle power generation system greatly reduces, if not eliminates, power conversion losses. Power extraction losses at the point of load are integrated into the expansion step in the propulsion/power cycle. Secondary pressurization functions are also removed which support actuator and control. Additionally, aircraft functions which include heating (such as ECS and ice protection) enhance cycle efficiency by utilizing waste heat from the system. Also, a uniform means for power distribution greatly simplifies the infrastructure necessary to support system maintenance. Further, in one example, the heat rejection heat exchanger 204 of the disclosed exemplary $CO_2$ engines may operate as a condenser during cruise, changing the cycle nature from super-critical to the trans-critical and improving the overall cycle efficiency.

Thus, the disclosed exemplary embodiments provide a uniform power distribution and medium without conversion losses between shaft power, electrical, and hydraulic operations. The disclosure also affords convenience of a closed cycle high pressure working fluid for actuation and controls, while also allowing for useful waste heat (wing, cabin, and galley heating). Thus, the disclosed embodiments integrate aircraft functions using s-$CO_2$ as a distribution medium for support of other aircraft functions besides propulsive power transfer (aircraft and engine controls/actuation, high lift device deployment, utility actuation, heating, ECS systems with trans-critical $CO_2$ vapor cycle cooling systems, and ice protection).

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. An aircraft power and propulsion system, comprising:
an air compressor;
a heat rejection heat exchanger;
a combustor positioned to receive compressed air from the air compressor as a core stream and provide thrust to the aircraft power and propulsion system; and
a closed-loop s-$CO_2$ system having carbon dioxide as a working fluid, that receives power from the combustor and rejects heat via the heat rejection heat exchanger to a cooling stream, the closed-loop s-$CO_2$ system is configured to provide power to:
a fan that provides the cooling stream and thrust;
the air compressor; and
at least one auxiliary load;
wherein the closed-loop system further comprises:
a first s-$CO_2$ turbine coupled to an s-$CO_2$ compressor via a first shaft;
a second s-$CO_2$ turbine coupled to the air compressor via a second shaft; and
a third s-$CO_2$ turbine coupled to the fan via a third shaft; and
wherein the first shaft, the second shaft, and the third shaft are axially offset from each other.

2. The aircraft power and propulsion system of claim 1, wherein the closed-loop s-$CO_2$ system provides power via the working fluid to the at least one auxiliary load by being configured to provide:
a first grade of energy to provide a first aircraft function; and
a second grade of energy to provide a second aircraft function.

3. The aircraft power and propulsion system of claim 2, wherein the first and second grades of energy are extracted at different entropy levels and at different stages within the closed-loop s-$CO_2$ system.

4. The aircraft power and propulsion system of claim 3, wherein one of the first and second grades of energy is extracted as one of:
output from the s-$CO_2$ compressor;
output from the combustor; and
output from the first s-$CO_2$ turbine and prior to entering the heat rejection heat exchanger.

5. The aircraft power and propulsion system of claim 2, wherein the at least one auxiliary load includes one of a heating function, an actuation function, and a mechanical load.

6. The aircraft power and propulsion system of claim 2, the closed-loop s-$CO_2$ system further comprising a recuperator positioned to exchange heat from the working fluid that exits the s-$CO_2$ compressor to the working fluid that exits one of the first, second, and third s-$CO_2$ turbines.

7. The aircraft power and propulsion system of claim 1, wherein the closed-loop s-$CO_2$ system is operated as a condenser during cruise of the aircraft, changing from super-critical to a trans-critical operation.

8. A method of providing power via an aircraft power and propulsion system, comprising:
receiving compressed air from an air compressor as a core stream to provide thrust to the aircraft power and propulsion system;
providing power in a closed-loop s-$CO_2$ system, having carbon dioxide as a working fluid, to:
a fan that provides a cooling stream and thrust to the aircraft;
the air compressor; and
at least one auxiliary load; and rejecting heat from the closed-loop s-$CO_2$ system via a heat rejection heat exchanger to the cooling stream;

wherein the closed-loop system further comprises:
- a first s-$CO_2$ turbine coupled to an s-$CO_2$ compressor via a first shaft;
- a second s-$CO_2$ turbine coupled to the air compressor via a second shaft; and
- a third s-$CO_2$ turbine coupled to the fan via a third shaft; and wherein the first shaft, the second shaft, and the third shaft are axially offset from each other.

9. The method of claim 8, further comprising providing power via the working fluid of the closed-loop s-$CO_2$ system to the at least one auxiliary load by: providing a first grade of energy to provide a first aircraft function; and providing a second grade of energy to provide a second aircraft function.

10. The method of claim 9, further comprising extracting the first and second grades of energy at different entropy levels and at different stages within the closed-loop s-$CO_2$ system, and further comprising extracting one of the first and second grades as one of:
- output from the s-$CO_2$ compressor;
- output from the combustor; and
- output from the first s-$CO_2$ turbine and prior to entering the heat rejection heat exchanger.

11. The method of claim 9, wherein the at least one auxiliary load includes one of a heating function, an actuation function, and a mechanical load.

12. The method of claim 9, further comprising operating the closed-loop s-$CO_2$ system as a condenser during cruise of the aircraft, changing from super-critical to a trans-critical operation.

13. The method of claim 8, further comprising recuperating heat of the closed-loop s-$CO_2$ system via a recuperator positioned to exchange heat from the working fluid that exits the s-$CO_2$ compressor to the working fluid that exits one of the first, second, and third s-$CO_2$ turbines.

14. A power-producing device for an aircraft, comprising:
- an air compressor;
- a heat rejection heat exchanger configured to reject heat from a working fluid of a closed-loop s-$CO_2$ system;
- a combustor positioned to receive compressed air from the air compressor as a core stream and provide thrust to the aircraft; and
- the closed-loop s-$CO_2$ system having carbon dioxide as the working fluid, that receives power from the combustor and rejects heat via the heat rejection heat exchanger to a cooling stream, the closed-loop system s-$CO_2$ configured to provide power to:
  - a fan that provides the cooling stream and thrust to the aircraft;
  - the air compressor; and
  - at least one auxiliary load;

wherein the closed-loop system further comprises:
- a first s-$CO_2$ turbine coupled to an s-$CO_2$ compressor via a first shaft;
- a second s-$CO_2$ turbine coupled to the air compressor via a second shaft; and
- a third s-$CO_2$ turbine coupled to the fan via a third shaft; and wherein the first shaft, the second shaft, and the third shaft are axially offset from each other.

15. The power-producing device of claim 14, wherein the closed-loop s-$CO_2$ system provides power via the working fluid to the at least one auxiliary load by being configured to provide:
- a first grade of energy to provide a first aircraft function; and
- a second grade of energy to provide a second aircraft function.

16. The power-producing device of claim 15, wherein the first and second grades of energy are extracted at different entropy levels and at different stages within the closed-loop s-$CO_2$ system.

17. The power-producing device of claim 16, wherein one of the first and second grades of energy is extracted as one of:
- output from the s-$CO_2$ compressor;
- output from the combustor; and
- output from the first s-$CO_2$ turbine and prior to entering the heat rejection heat exchanger.

18. The power-producing device of claim 14, further comprising a cooling circuit having an additional compressor operable in a vapor cycle system (VCS).

19. The power-producing device of claim 14, wherein the closed-loop s-$CO_2$ system is operated as a condenser during cruise of the aircraft, changing from super-critical to a trans-critical operation.

* * * * *